(12) United States Patent
MacMartin

(10) Patent No.: US 9,616,969 B2
(45) Date of Patent: Apr. 11, 2017

(54) GEARING SYSTEM FOR A DUAL-POWERED BICYCLE

(71) Applicant: Freeflow Technologies Limited, Glasgow Strathclyde (GB)

(72) Inventor: Neil MacMartin, Glasgow Strathclyde (GB)

(73) Assignee: Freeflow Technologies Limited, Glasgow Strathclyde (GB)

( * ) Notice: Subject to any disclaimer, the term of this patent is extended or adjusted under 35 U.S.C. 154(b) by 0 days.

(21) Appl. No.: 14/380,448

(22) PCT Filed: Feb. 22, 2013

(86) PCT No.: PCT/GB2013/050432
§ 371 (c)(1),
(2) Date: Aug. 22, 2014

(87) PCT Pub. No.: WO2013/124665
PCT Pub. Date: Aug. 29, 2013

(65) Prior Publication Data
US 2015/0011346 A1    Jan. 8, 2015

(30) Foreign Application Priority Data
Feb. 24, 2012   (GB) .................................. 1203211.6

(51) Int. Cl.
*F16H 37/06*    (2006.01)
*B62M 6/55*     (2010.01)
(Continued)

(52) U.S. Cl.
CPC ................. *B62M 6/55* (2013.01); *B60K 1/00* (2013.01); *F16H 1/28* (2013.01)

(58) Field of Classification Search
CPC ............. B62M 6/40; B62M 6/55; B62M 6/60
(Continued)

(56) References Cited

U.S. PATENT DOCUMENTS 5,901,807 A  *  5/1999  Tseng ..................... B62M 6/55
                                                  180/206.3
6,230,586 B1    5/2001  Chang
(Continued)

FOREIGN PATENT DOCUMENTS

CH         593822 A5    12/1977
EP        2216242 A1     8/2010

OTHER PUBLICATIONS

International Search Report dated Jul. 3, 2013 for PCT/GB2013/050432.

*Primary Examiner* — Ha D Ho
(74) *Attorney, Agent, or Firm* — Abel Law Group, LLP

(57) ABSTRACT

A gearing system comprises a first rotational input, a second rotational input and a rotational output. The first rotational input and second rotational input may transmit a rotation to the rotational output, wherein one of the first rotational input and second rotational input is connected to the rotational output through a one way clutch, and wherein the other of the first rotational input and second rotational input is connected to the rotational output through an overrunning clutch, wherein said one way clutch and said overrunning clutch are rotationally coupled. The gearing system may be used in electric bicycles, but may also be used in other dual propulsion vehicles such as hybrid cars.

11 Claims, 6 Drawing Sheets

(51) Int. Cl.
*F16H 1/28* (2006.01)
*B60K 1/00* (2006.01)
(58) Field of Classification Search
USPC ............. 74/665 A, 665 B, 665 C; 180/206.1, 180/206.4, 206.5, 220
See application file for complete search history.

(56) References Cited

U.S. PATENT DOCUMENTS

| | | | | |
|---|---|---|---|---|
| 6,554,730 B1* | 4/2003 | Sakai | ....................... | B62M 6/55 180/206.4 |
| 7,284,631 B2* | 10/2007 | Rizzetto | ................... | B62M 6/55 180/206.4 |
| 8,684,122 B2* | 4/2014 | Maeno | ..................... | B62M 6/55 180/205.1 |
| 9,120,532 B2* | 9/2015 | Huang | .................... | B62M 6/55 |

* cited by examiner

GEARING SYSTEM FOR A DUAL-POWERED BICYCLE

FIELD OF THE INVENTION

The present invention relates to vehicle gearing systems, especially those used in relation to electric bicycles.

BACKGROUND TO THE INVENTION

Electric bicycles are a form of dual-powered vehicles: they employ both a manual pedal and crank drive and an electric motor. These two drives may function independently of one another or may function together to augment one another's motive force. A user may choose to selectively engage the electric drive, or the electric drive may be activated automatically depending on such conditions as the measured pedal velocity, bicycle velocity, etc.

The electric drive may be located in several places; it may drive and be located within the hub of the rear wheel; it can power the pedal crank; or it may be located at some point between these two extremes, driving the chain of the bicycle. An alternative is to drive the front wheel, but this brings its own drawbacks.

The power source, usually a rechargeable battery, has to be located on the bicycle, and usually a bulky battery will be placed over or around the rear wheel.

Laws are in place around the world to limit the speed at which the electrical drive may propel such a bicycle, primarily for the safety of the user. The speed may be limited to around 15 mph. However, the user may be free to manually propel the bicycle beyond this velocity.

Drawbacks of current electrical bicycles include the bulk of the drive/battery mechanism making the bicycle cumbersome for the rider. A further drawback is in the potential for crank-driven pedalling or sudden cessation to damage the motor if that drives the crank. For example, an electric bicycle may be travelling under combined electric drive and user pedalling. If the user has to undertake an emergency stop, their reaction is to immediately stop pedalling holding the crank at a fixed angle. Whilst the bicycle may be provided with a brake lever mounted electric drive cut-off, the cessation of pedalling by the user may occur before this is activated and there will be a short period of time where the electric motor is driving the crank while the user is attempting to simultaneously hold the crank static. This can lead to the motor being damaged and/or the user's feet being forced around in an unwanted, unsettling and perhaps unbalancing pedalling motion.

SUMMARY OF THE INVENTION

According to a first aspect of the present invention there is provided a vehicle gearing system comprising a first rotational input, a second rotational input and a rotational output, wherein the first rotational input and second rotational input may transmit a rotation to the rotational output, wherein one of the first rotational input and second rotational input is connected to the rotational output through a one way clutch, and wherein the other of the first rotational input and second rotational input is connected to the rotational output through an overrunning clutch, wherein said one way clutch and said overrunning clutch are rotationally coupled.

The axis of rotation of the first rotational input may be perpendicular to the axis of rotation of the second rotational input.

The axis of rotation of the rotational output may be parallel to either the axis of rotation of the first rotational input or the second rotational input.

The one way clutch may be rotationally coupled to the overrunning clutch by a bracket.

The bracket may comprise a cylindrical housing and a cylindrical mounting.

One of the one way clutch and overrunning clutch may be mounted within the cylindrical housing and the other of the one way clutch and overrunning clutch may be mounted around the cylindrical mounting.

The one way clutch may be mounted within the cylindrical housing with an outer race of said one way clutch rotationally coupled to an inner surface of the cylindrical housing and the overrunning clutch may be mounted around the cylindrical mounting.

The one way clutch may be a sprag clutch.

The overrunning clutch may be a freewheel assembly.

The first or second rotational input may be an electric motor.

The first or second rotational input may be manually driven.

According to a second aspect of the present invention there is provided a bicycle including a vehicle gearing system according to the first aspect.

According to a third aspect of the present invention there is provided a vehicle including a vehicle gearing system according to the first aspect.

BRIEF DESCRIPTION OF THE DRAWINGS

An embodiment of the present invention will now be described, by way of example only, with reference to the following drawings in which.

Figure 1:
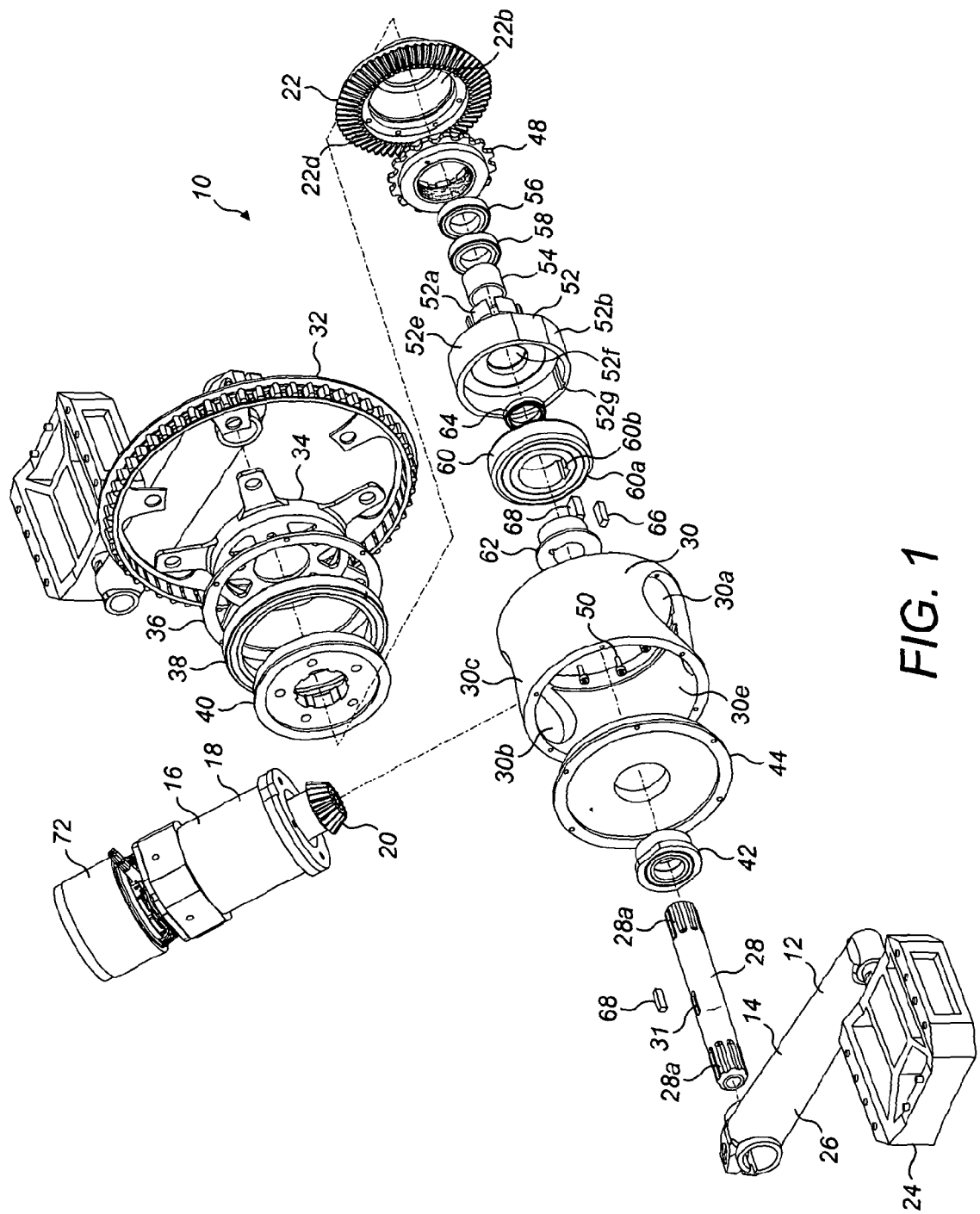
FIG. 1 is an exploded perspective view of a vehicle gearing system according to the present invention.

Referring to the drawings and initially to FIG. 1, a vehicle gearing system 10 is shown. The vehicle gearing system 10 comprises a first rotational input 12 being a bicycle pedal crank 14, a second rotational input 16 comprising an electric motor 72, driving a bevel gear 20 via a gearbox 18. The bevel gear 20 in turn drives a ring gear 22.

The bicycle pedal crank 14 is of a known arrangement, comprising pedals 24 attached to crank arms 26. The cranks arms 26 are connected to an axle 28. The axle 28 is an elongate, substantially cylindrical component, with splines 28a provided at each end to provide more secure attachment between the axle 28 and the crank arms 26. A keyseat 31 is provided on the axle 28.

A frame bottom bracket 30 of a bicycle frame 100 houses the vehicle gearing system 10. The frame bottom bracket 30 is a substantially hollow cylindrical shape, with two apertures 30a, 30b in the cylindrical sidewall 30c. Both circular ends 30d, 30e are open, to enable the frame bottom bracket 30 to receive various components of the system 10.

The axle 28 extends through the frame bottom bracket 30 when assembled.

Various known crank set components are provided on the right-hand (from the perspective of the FIGS.) side of the axle 28. These are a front sprocket 32, a spider 34, a bottom bracket cap 36, a crank bearing 38 and a splined sprocket disc 40. The bottom bracket cap 36 acts as a seal to mitigate ingress of debris or contaminants.

Further known crank set components are provided on the right-hand side (from the perspective of the FIGS.) side of the axle 28. These are a bottom bracket inner bearing 42 and a bottom bracket plate cover 44. The bottom bracket outer bearing 44 attaches to the frame bottom bracket 30 via bolts (not shown) thereby covering the circular end 30e and providing a bearing support for the axle 28.

Within the frame bottom bracket 30 and also disposed around the axle 28 are various components which enable the transmission of power from the two sources to the rear driven wheel of the bicycle 100.

From the right hand side of the FIGS. i.e. from the crank set side these are firstly a spacer 46. The spacer 46 is of a known form and is of a generally annular form. This abuts the left hand face of the splined sprocket disk 40.

The ring gear 22 is an annulus with a generally frusto-conical cross-section. Within the interior is a first flange 22a which projects inwardly into its central aperture 22b. A second flange 22c projects from the opposite face of the ring gear 22 from which the gear teeth 22d are located (right hand side from the perspective of the FIGS.) of the first flange 22a.

A gear freewheel assembly 48 attaches to the ring gear 22 via the first and second flanges 22a,22c; thus, it locates within the central aperture 22b of the ring gear 22. Bolts 50 secure the gear freewheel assembly 48 to the ring gear 22.

Both the gear freewheel assembly 48 and the ring gear 22 attach around an inner bottom bracket 52. The inner bottom bracket 52 comprises two cylindrical sections: a first cylindrical section 52a of a lesser diameter located in use towards the crank set and a second cylindrical section 52b of greater diameter. The first cylindrical section 52a has several slots 52c in its sidewall running along its length. These slots help to reduce weight by reducing material, increase frictional grip by a spline-type arrangement and may enable a degree of expansion by splaying.

Figure 2:
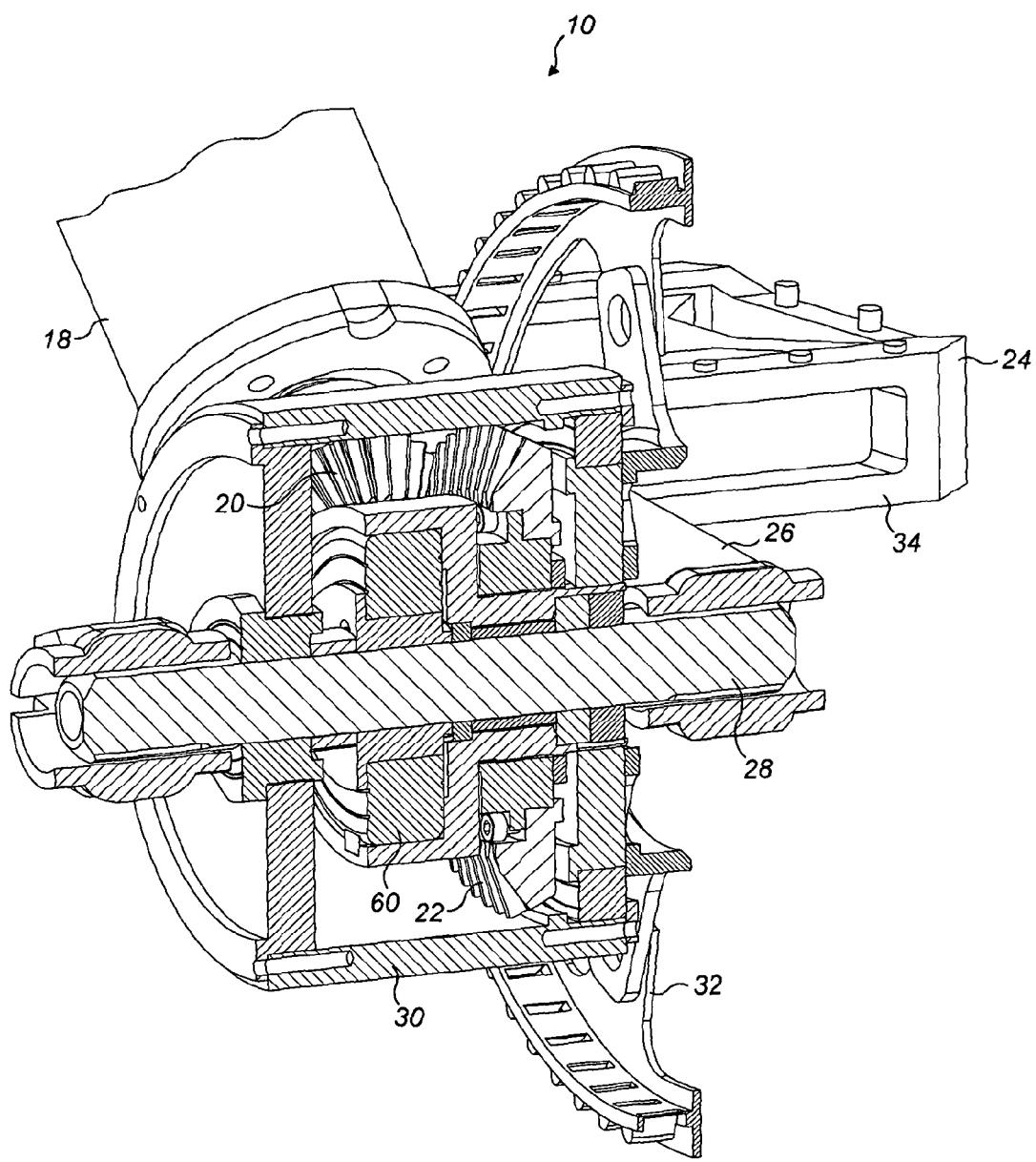
FIG. 2 is a sectional perspective view of the vehicle gearing system of FIG. 1.
Figure 3:
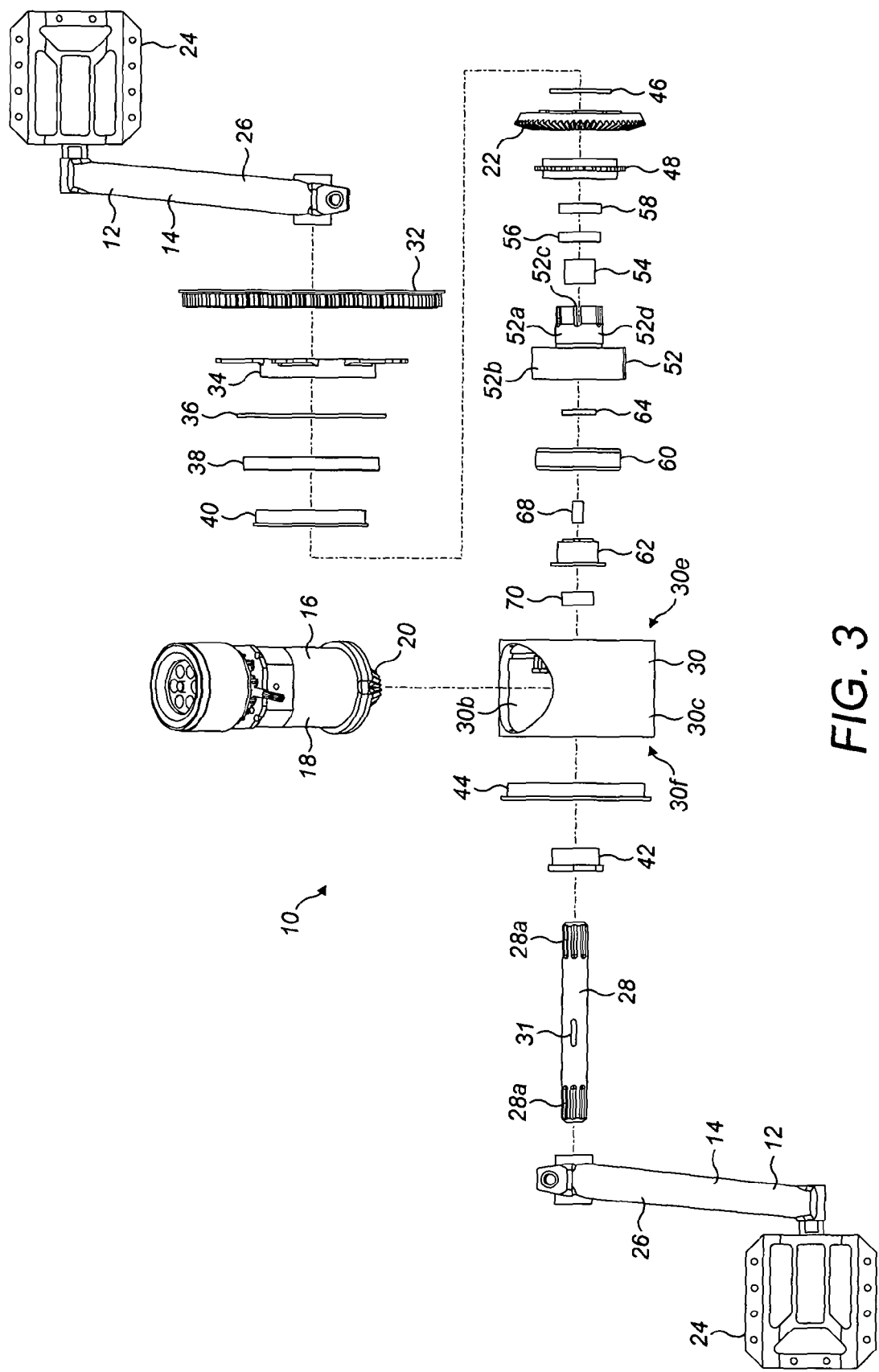
FIG. 3 is an exploded end view of the vehicle gearing system of FIG. 1.
Figure 4:
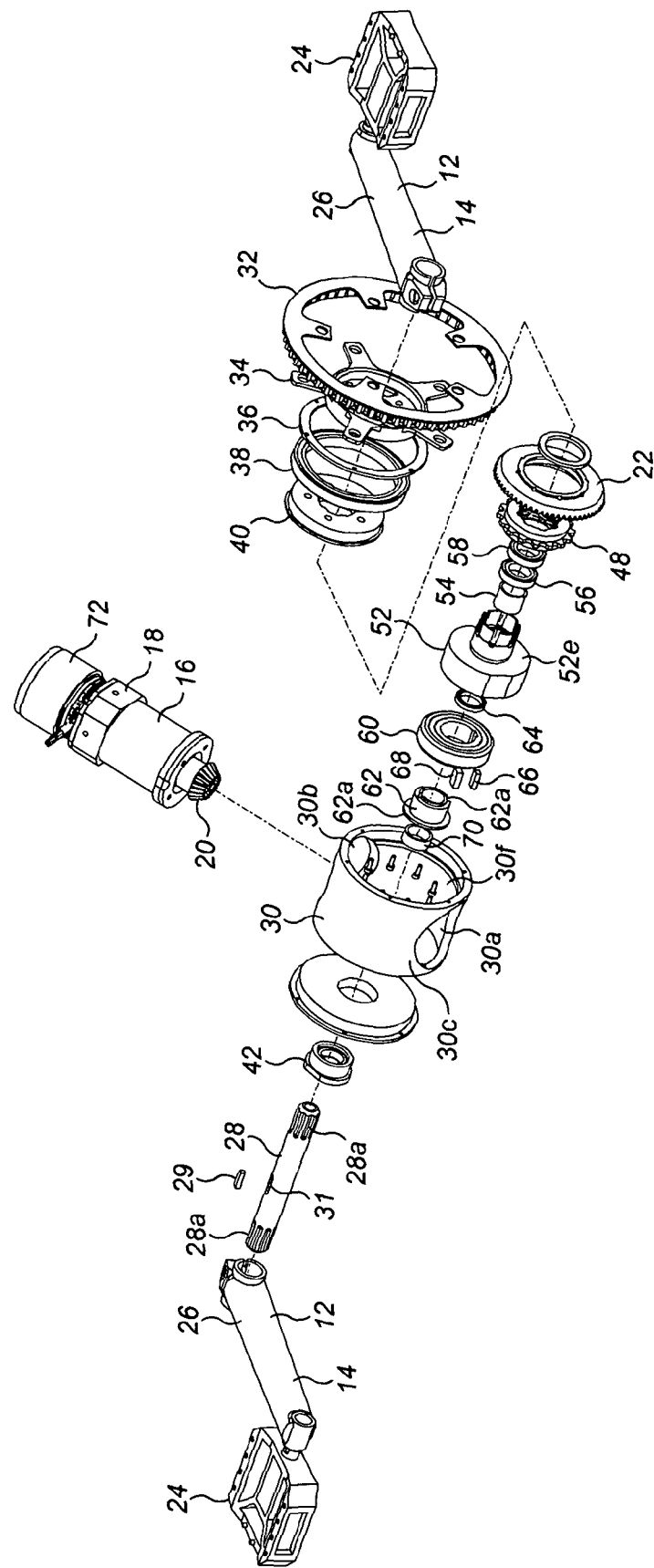
FIG. 4 is an exploded perspective view from a different angle of the vehicle gearing system of FIG. 1.
Figure 5:
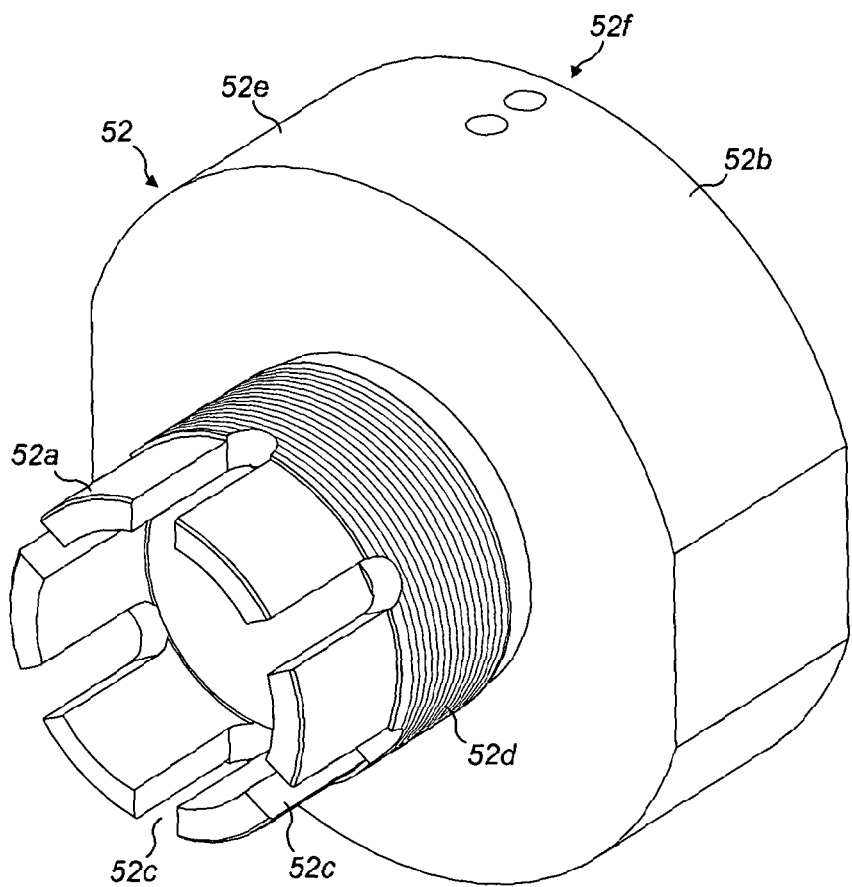
FIG. 5 is a perspective view of an inner bottom bracket of the vehicle gearing system of FIG. 1.
Figure 6:
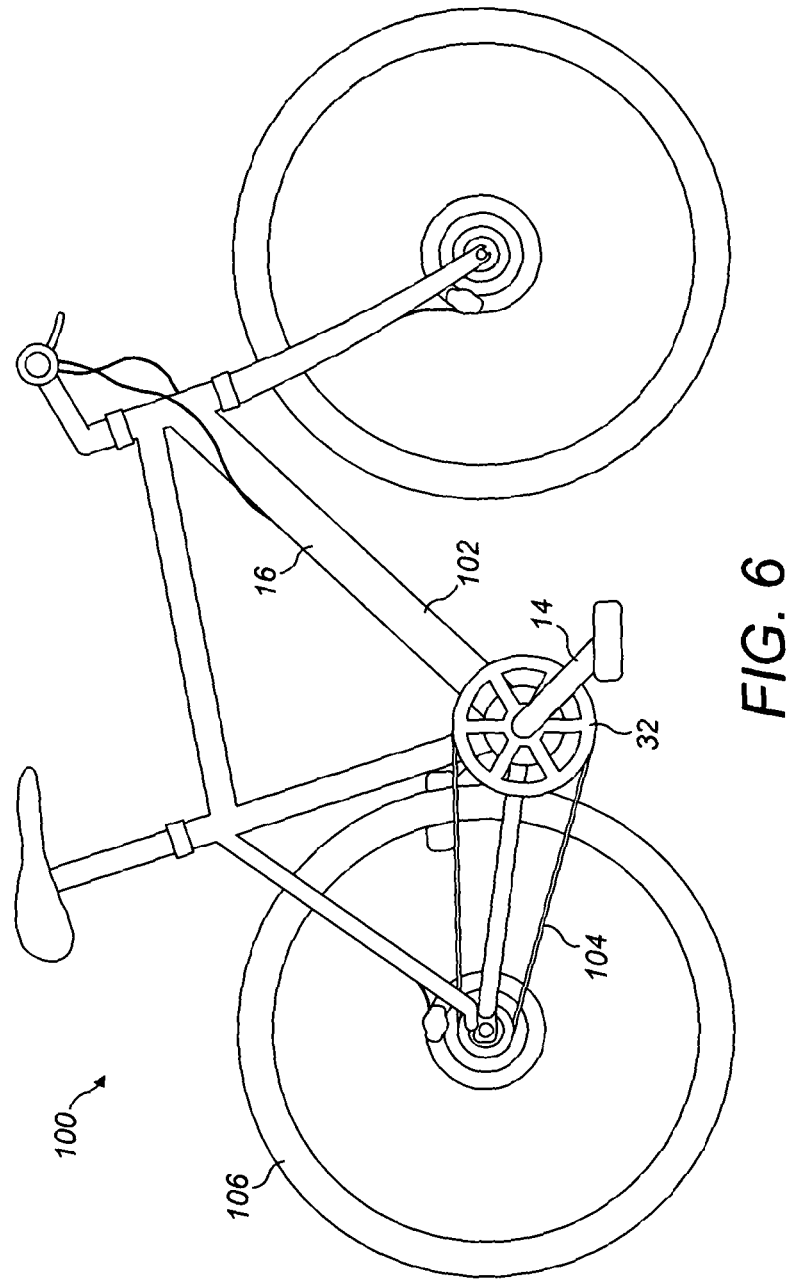
FIG. 6 is a side elevation of a bicycle including the vehicle gearing system of FIG. 1.

As can be seen from FIG. 2, the gear freewheel assembly 48 and the ring gear 22 attach around the first cylindrical section 52a. There are cooperating threads 48a (on the gear freewheel assembly 48) and 52d (on the first cylindrical section 52a) which allow the components to be connected together. It will be appreciated by the skilled addressee that other suitable joining methods may be employed. In the present embodiment, the threading on the first cylindrical section 52a is on the non-slotted section, but may be provided in an alternative embodiment on the slotted portion, exclusively or in conjunction with threading on the non-slotted portion.

A further elongate spacer 54 is positioned within the interior of the first cylindrical section 52a, surrounding axle 28. Two freewheel-side bearings 56,58 are provided around the spacer 54, between it and the axle 28.

A bottom bracket flange 52e is provided between the first cylindrical section 52a and the second cylindrical section 52b. A housing 52f is therefore formed within the interior of the second cylindrical section 52b. A one-way sprag clutch bearing 60 is located within this housing 52f.

The inner bottom bracket 52 rotationally couples the one way sprag clutch bearing 60 and the freewheel assembly 48.

The one-way sprag clutch bearing 60 is annular in form, and within its interior aperture is located a bearing shim 62 which surrounds axle 28.

A bottom bracket bearing 64 is sandwiched between the bearing shim 62 and the elongate spacer 54, located substantially coplanar with the bottom bracket flange 52e.

An outer sprag clutch key 66 locates the one-way sprag clutch bearing 60 within the housing 52f by forming an interference fit via an outer bearing slot 60a provided on the outer circumference of the outer race of the one-way sprag clutch bearing 60 and a housing slot 52g.

An inner sprag clutch key 68 locates the bearing shim 62 within the one-way sprag clutch bearing 60 by similarly forming an interference fit via an inner bearing slot 60b provided on the inner circumference of the inner race of the one-way sprag clutch bearing 60 and a shim slot 62a. Inner sprag clutch key 68 also sits within the keyseat 31 of the axle, thereby causing an interference fit and rotationally coupling the sprag clutch bearing 60 to the inner bottom bracket 52.

A bottom bracket spacer 70 surrounds the axle 28 abutting both a flange 62a of the bearing shim 62 on one side (the right hand side from the perspective of the FIGS.) and the bottom bracket inner bearing 42 on the opposite side (the left hand side from the perspective of the FIGS.).

The bevel gear 20 meshes with the ring gear 22. It will be noted that the two components mesh perpendicularly i.e. the rotational axis of the bevel gear is perpendicular to the rotational axis of the ring gear. The bevel gear 20 projects through the uppermost aperture 30b of the frame bottom bracket 30. The bevel gear 20 is driven by an electric motor 72 and gearbox 18 having a battery (not shown) as their power source.

The electric motor 72, gearbox 18 and battery are located within the bicycle's down tube 102. The down tube 102 would be attached, usually by some form of welding (such as TIG welding), to the uppermost aperture 30b of the frame bottom bracket 30. The lowermost aperture 30a may have a simple cap cover, enabling access to the components located within the frame bottom bracket 30.

The electric motor 72, gearbox 18 and battery may be of any suitable type, and may have a working speed of around 8000 RPM for bicycle applications. For other applications, including larger vehicles such as cars, the working speed may be up to 32000 RPM.

In use, the electric motor 72 will drive the ring gear 22, which will then drive, through the mechanism described above, the front sprocket 32. As with prior art bicycles, a chain 104 connects the front sprocket 32 to the rear wheel of the bicycle, either directly, or via a rear wheel gearing system such as derailleur gears or a hub gear. Thus, the electric motor 72 supplies torque to the rear wheel 106.

The user may augment this torque by rotating the front sprocket 32 with a pedalling motion via their feet and the pedals 24/crank arms 26.

The electric motor 72 will be limited to a predetermined speed by the local law where the bicycle is being used. In the present embodiment that will be about 24.8 km/h (15.5 mph). The electric motor 72 may have a control system, allowing the user to determine whether it augments the user's torque input or not.

In the situation where user and motor 72 are providing torque to the system 10, both user and motor provide torque to the front sprocket 32 and its therefore less effort for the user.

Should the user exceed the predetermined speed limit of the motor 72, the axle 28 will attain a higher rotational speed than the ring gear 22. If the ring gear 22 and axle 28 were axially fixed this would present a problem, either the user may force the motor 72 beyond its limit, or the motor may impede the user from pedalling faster than its limit. The user may at best waste effort and at worst damage the motor 72. The presence of the one-way sprag clutch bearing 60 allows the axle 28 and ring gear 22 to attain different rotational speeds allowing the user to pedal beyond the limit of the motor 72.

Emergency braking can be a hazardous event in prior art electric bicycles. An emergency cut-off will be activated by the user applying the handlebar mounted break lever thereby cutting power to the motor and stopping the application of torque to the driven wheel.

The natural reaction of a bicycle user in such a situation is first to stop pedalling i.e. holding their feet steady and the crank arms at a fixed angle and then to apply the brake. These two actions may be separated by only a miniscule amount of time due to the inertia of the rotating internal components of the electric motor 72, but there is a delay nonetheless. In this timeframe, the motor will continue to apply torque, and may force the crank arms around, against the effort of the user. Whilst this may only occur for a fraction of a second, it can be enough to unnerve or even throw the user off balance; an undesirable situation if the user is attempting to stop quickly yet safely.

The one-way sprag clutch bearing 60 means that torque from the motor 72 does not drive the cranks arms 26, only the front sprocket 32. Therefore, in an emergency stop situation as described above, the small period between the user ceasing to pedal and the motor 18 being cut-off is less likely to be accompanied by an unbalancing or unnerving of the user.

Various modifications and improvements may be made to the embodiment described above without departing from the scope of the present invention. For example, the inner bottom bracket 52 may be altered or may be replaced altogether by a one way clutch bearing having a suitably designed outer and/or inner race.

A derailleur gear assembly and multiple front sprockets may be provided to provide more flexibility in the gearing of the vehicle. The axle 28 need not have a cylindrical shape, and may be any suitable shape such as a prism with a triangular cross-section, square-cross section, pentagonal, or any polygonal cross-section.

The ring gear 22 of the freewheel assembly 48 need not be a frusto-conical arrangement, but may be any suitable type, such as a helical or double-helical type, with a corresponding change to the bevel gear 20.

The freewheel assembly 48 may be replaced with another suitable overrunning clutch, and the sprag clutch bearing 60 may be replaced with other suitable one way clutches.

Although described as being attached by bolts 50, ring gear 22 may attach to gear freewheel assembly by any other suitable means, such as there being corresponding and cooperating threads on each component. Further, they may be formed integrally.

The freewheel-side bearings 56,58 may be replaced by brass bushes. In fact, any of the described simple bearings may be replaced by brass bushes.

Although bicycle 100 is described as having a chain 104, it will be appreciated that this may be replaced with a belt drive.

Although described in connection with an electric bicycle, it will be appreciated that this may apply to other forms of dual propulsion vehicles, such as electric cars, vans, busses, trucks, etc. The vehicle gearing system may be attached to a KERS (Kinetic Energy Recovery System) in such an application.

The invention claimed is:

1. A gearing system comprising a first rotational input, a second rotational input and a rotational output, wherein the first rotational input and second rotational input may transmit a rotation to the rotational output, wherein one of the first rotational input and second rotational input is connected to the rotational output through a one way clutch, and wherein the other of the first rotational input and second rotational input is connected to the rotational output through an overrunning clutch, wherein said one way clutch and said overrunning clutch are rotationally coupled by a bracket which includes a cylindrical housing and a cylindrical mounting, wherein one of the one way clutch and overrunning clutch is mounted within the cylindrical housing and the other of the one way clutch and overrunning clutch is mounted around the cylindrical mounting, and wherein the inner diameter of the cylindrical housing is greater than the outer diameter of the cylindrical mounting.

2. A gearing system according to claim 1 wherein the axis of rotation of the first rotational input is perpendicular to the axis of rotation of the second rotational input.

3. A gearing system according to any of claim 1 wherein the axis of rotation of the rotational output is parallel to either the axis of rotation of the first rotational input or the second rotational input.

4. A gearing system according to claim 1 wherein the one way clutch is mounted within the cylindrical housing with an outer race of said one way clutch rotationally coupled to an inner surface of the cylindrical housing and the overrunning clutch is mounted around the cylindrical mounting.

5. A gearing system according to claim 1 wherein the one way clutch is a sprag clutch.

6. A gearing system according to claim 1 wherein the overrunning clutch is a freewheel assembly.

7. A gearing system according to claim 1 wherein the first or second rotational input is an electric motor.

8. A gearing system according to claim 1 wherein the first or second rotational input is manually driven.

9. A bicycle including a gearing system according to claim 1.

10. A vehicle including a gearing system according to claim 1.

11. A gearing system according to claim 1 wherein the cylindrical mounting is nearer to the rotational output than the cylindrical housing is located relative to the rotational output.

* * * * *